(12) United States Patent
Narayanan et al.

(10) Patent No.: US 9,055,414 B2
(45) Date of Patent: Jun. 9, 2015

(54) TEXT MESSAGING PIPELINE CONFIGURATION

(75) Inventors: Raman Narayanan, Bellevue, WA (US); Bruce E. Johnson, Bellevue, WA (US); Rajendra H. Vishnumurty, Bellevue, WA (US); Ming Liu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1127 days.

(21) Appl. No.: 12/389,484

(22) Filed: Feb. 20, 2009

(65) Prior Publication Data

US 2010/0216493 A1  Aug. 26, 2010

(51) Int. Cl.
*H04W 4/12* (2009.01)
*H04L 12/58* (2006.01)
*H04W 8/18* (2009.01)

(52) U.S. Cl.
CPC ............. *H04W 4/12* (2013.01); *H04L 12/5895* (2013.01); *H04L 51/12* (2013.01); *H04L 12/585* (2013.01); *H04W 8/18* (2013.01)

(58) Field of Classification Search
None
See application file for complete search history.

(56) References Cited

U.S. PATENT DOCUMENTS

| | | | |
|---|---|---|---|
| 6,057,841 A * | 5/2000 | Thurlow et al. | 715/809 |
| 6,807,576 B1 * | 10/2004 | Jeffries et al. | 709/225 |
| 6,819,932 B2 | 11/2004 | Allison et al. | |
| 7,194,515 B2 * | 3/2007 | Kirsch | 709/206 |
| 7,200,636 B2 * | 4/2007 | Harding | 709/206 |
| 7,239,866 B2 * | 7/2007 | Cai et al. | 455/414.1 |
| 7,453,894 B1 * | 11/2008 | Qin et al. | 370/401 |
| 7,487,183 B1 * | 2/2009 | Schmidt | 1/1 |
| 7,580,719 B2 * | 8/2009 | Karmarkar | 455/466 |
| 7,650,333 B2 * | 1/2010 | Li et al. | 707/999.003 |
| 7,660,594 B2 * | 2/2010 | Chava et al. | 455/466 |
| 7,756,929 B1 * | 7/2010 | Pettigrew et al. | 709/206 |
| 7,899,475 B2 * | 3/2011 | Veeraraghavan et al. | 455/466 |
| 2002/0049818 A1 * | 4/2002 | Gilhuly et al. | 709/206 |

(Continued)

OTHER PUBLICATIONS

Seo, et al., "SMS based Advanced Sender Authentication Mechanism for Anti-Spam based on DomainKey", retrieved at <<http://paper.ijcsns.org/07_book/200703/20070319.pdf>>, IJCSNS International Journal of Computer Science and Network Security, vol. 7 No. 3, Mar. 2007, pp. 124-130.

(Continued)

*Primary Examiner* — Backhean Tiv
(74) *Attorney, Agent, or Firm* — Dan Choi; Judy Yee; Micky Minhas

(57) ABSTRACT

Text messaging between cell phones, computer applications, and/or other communication devices has become a common means of communication. Because of the prevalence of text messaging, robust text message processing may be facilitated through text messaging pipelines. Accordingly, as provided herein, a text messaging pipeline may be configured according to a pipeline module list. The pipeline module list may be constructed through an online service wherein predefined pipeline modules and/or user defined pipeline modules may be selected to create the pipeline module list. The configured text messaging pipeline may provide customized text message processing. For example, a user may select a spam filter, a translator, and/or other pipeline modules to configure a text messaging pipeline. Text message workflow (e.g., SMS messages that are sent and/or received by a computer application associated with the text messaging pipeline) may be processed through the text messaging pipeline.

20 Claims, 8 Drawing Sheets

(56) References Cited

U.S. PATENT DOCUMENTS

| | | | |
|---|---|---|---|
| 2002/0069048 A1* | 6/2002 | Sadhwani et al. | 704/3 |
| 2002/0120600 A1* | 8/2002 | Schiavone et al. | 707/1 |
| 2003/0182383 A1* | 9/2003 | He | 709/206 |
| 2004/0102201 A1* | 5/2004 | Levin | 455/466 |
| 2004/0230531 A1* | 11/2004 | Weiss | 705/53 |
| 2005/0015455 A1* | 1/2005 | Liu | 709/207 |
| 2005/0081059 A1* | 4/2005 | Bandini et al. | 713/201 |
| 2005/0186974 A1* | 8/2005 | Cai | 455/466 |
| 2005/0198173 A1* | 9/2005 | Evans | 709/206 |
| 2006/0036690 A1* | 2/2006 | O'Neil | 709/206 |
| 2006/0079255 A1 | 4/2006 | Bantukul et al. | |
| 2006/0168030 A1 | 7/2006 | Cai et al. | |
| 2006/0168031 A1 | 7/2006 | Cai et al. | |
| 2006/0168056 A1* | 7/2006 | Gandhi et al. | 709/206 |
| 2006/0242430 A1* | 10/2006 | Marsh et al. | 713/190 |
| 2007/0016636 A1* | 1/2007 | Boerries et al. | 709/200 |
| 2007/0041370 A1* | 2/2007 | Cleveland | 370/352 |
| 2007/0208813 A1* | 9/2007 | Blagsvedt et al. | 709/206 |
| 2007/0233861 A1 | 10/2007 | Cai et al. | |
| 2008/0004048 A1 | 1/2008 | Cai et al. | |
| 2008/0004049 A1* | 1/2008 | Yigang et al. | 455/466 |
| 2008/0016159 A1* | 1/2008 | Cai | 709/206 |
| 2008/0046529 A1* | 2/2008 | Gilhuly et al. | 709/206 |
| 2008/0147808 A1* | 6/2008 | Pang | 709/206 |
| 2008/0207181 A1 | 8/2008 | Jiang | |
| 2009/0016499 A1* | 1/2009 | Hullfish et al. | 379/93.01 |
| 2009/0047929 A1* | 2/2009 | Chesnutt et al. | 455/411 |
| 2009/0144374 A1* | 6/2009 | Laborde | 709/206 |
| 2009/0144387 A1* | 6/2009 | Smith et al. | 709/207 |
| 2009/0150500 A1* | 6/2009 | Kumar et al. | 709/206 |
| 2009/0252159 A1* | 10/2009 | Lawson et al. | 370/352 |
| 2010/0035639 A1* | 2/2010 | Gupta et al. | 455/466 |
| 2010/0113074 A1* | 5/2010 | Sheppard | 455/466 |
| 2010/0191761 A1* | 7/2010 | Avitzur et al. | 707/769 |

OTHER PUBLICATIONS

"A Quick Look at eMail Spam Filters", retrieved at <<http://www.askmex.com/software-networking/article4483.htm>>, Dec. 18, 2008, pp. 2.

* cited by examiner

TEXT MESSAGING PIPELINE CONFIGURATION

BACKGROUND

Text messaging (e.g., short message service (SMS)) has become a prevalent means of communication. Text messaging may be utilized through cell phones, computer applications, and/or other communication devices. Like e-mail, text messages may be processed to add value to text messaging. For example, a text message may be logged, translated, filtered, fanned out to a distribution list, etc. Currently, computer applications manage and execute text message processing at the computer application level before calling an exposed text messaging service.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

A technique for configuring a text messaging pipeline is provided herein. A set of available pipeline modules may be presented to a user, wherein the presentation may be through an online service that a user may interact with (e.g., register a computer application with). The user may be able to select available pipeline modules to generate a pipeline module list. The pipeline module list may comprise at least one pipeline module that is to be associated with a text messaging pipeline. The text messaging pipeline may be configured according to the pipeline module list. The text messaging pipeline may comprise predefined pipeline modules and/or user defined pipeline modules. The pipeline modules may connect to a $3^{rd}$ party service for execution and/or processing.

Text message workflow (e.g., a received SMS text message that is to be delivered to a recipient) may be processed through the text messaging pipeline. The pipeline modules within the text messaging pipeline may be executed upon the text message workflow. The execution of the text messaging pipeline may occur within an online service. For example, a user may register a computer application with an online service. The user may select pipeline modules (e.g., a filter module, a translation module, etc.) to use in configuring a text messaging pipeline. The text messaging pipeline may be configured with the selected pipeline modules. An outgoing text message from the computer application to a remote cell phone, for example, may be processed as a text message workflow through the text messaging pipeline before being delivered to the remote cell phone.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
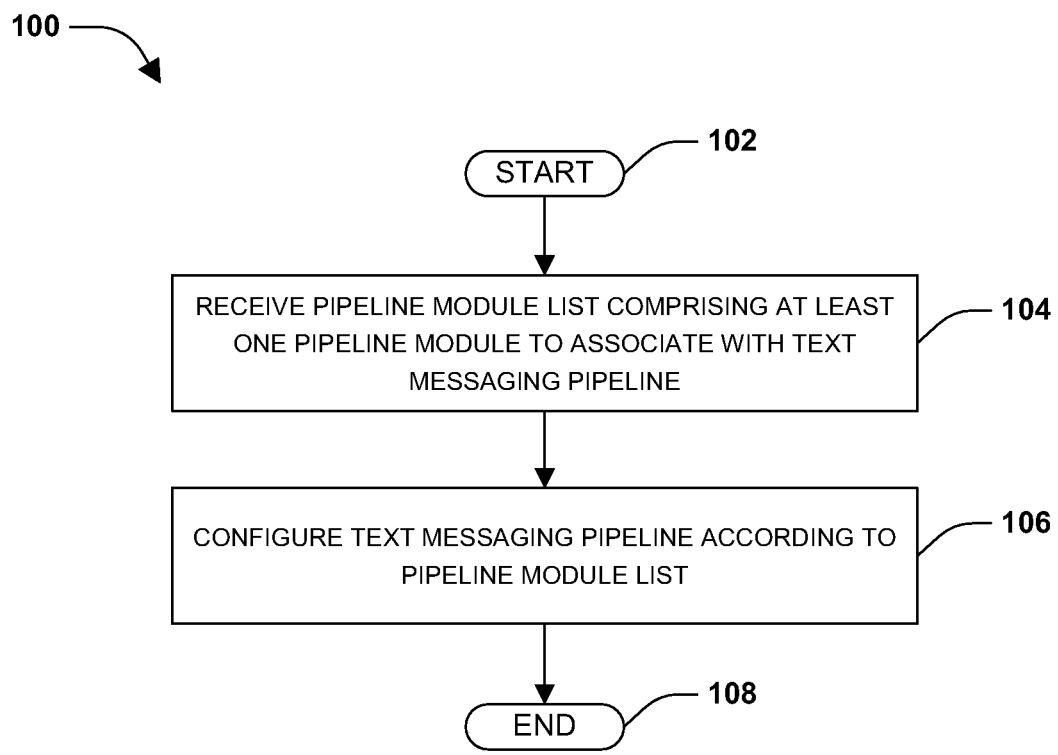
FIG. 1 is a flow chart illustrating an exemplary method of configuring a text messaging pipeline.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Text messaging services, such as short message service (SMS), are commonly used for communication. To facilitate text messaging, mobile operators, third parties, and aggregators may expose their text messaging services. This allows computer applications to receive, process, and send text messages. For example, a computer application may receive and count votes for a contest through incoming text messages. The computer application may send confirmation text messages to the original senders, for example.

Text message processing may be performed upon text message workflow to provide enhanced features. For example, a text messaging pipeline may be executed upon a text message to provide spam filtering, message logging, translation, and/or other processing. Currently, computer applications utilizing a text messaging service may handle the text message processing itself before calling the text messaging service. Providing this additional functionality at the computer application level creates additional overhead, network traffic, and/or reallocation of resources.

As provided herein, a technique for configuring a text messaging pipeline is disclosed. A text messaging pipeline may be built, configured, and/or executed to provide text message processing. For example, a text messaging pipeline may comprise pipeline modules comprising functionality that may be executed upon text message workflow (e.g., an incoming text message that is to be processed and delivered to a recipient). Pipeline modules may comprise user defined pipeline modules and/or predefined pipeline modules.

Predefined pipeline modules may be pipeline modules that are prebuilt and selectable within a set of available pipeline modules. Predefined pipeline modules allow a user to select pipeline modules without having to create the pipeline modules. The predefined pipeline modules may be created, accessible and/or executable through $3^{rd}$ parties, for example.

User defined pipeline modules may be pipeline modules a user (e.g., a user of a text message processing online service) created. The user defined pipeline modules may be associated with the text messaging pipeline (e.g., uploaded to a web service comprising the text messaging pipeline and/or a corresponding text messaging service). This provides flexibility and customization of pipeline modules. For example, a scripting engine module may be available for configuration within a text messaging pipeline. If the scripting engine module is selected to be configured within the text messaging pipeline, then user defined script may be associated with the scripting engine module for execution during text message processing. This allows for the creation and execution of dynamically defined user logic in the text message processing (e.g., text messaging pipeline) above and beyond creation of a statically complied user defined pipeline module.

Text messaging services may be hosted and/or configured through an online service. In one example, a text messaging pipeline associated with a text messaging service may be hosted as an online service. Users may be able to setup accounts, login through delegated credentials, register computer applications that may utilize the text messaging service, configure a text messaging pipeline, and/or perform other tasks. Hosting the text messaging pipeline as an online service may free-up local resources that were previously consumed in providing local text message processing by a computer application.

In one example, the text messaging pipeline may be hosted within a shared computing facility. The text messaging pipeline may provide a secure environment for text message processing because security and permission (e.g., permission to enable execution of trusted subset of code) may be facilitated within the shared computing facility. To enhance security, pipeline modules within the text messaging pipeline may be digitally signed for ownership and/or assignment of execution permission. The pipeline modules within the text messaging pipeline may be configured and managed by the shared computing facility, thus mitigating interference between pipeline modules and/or other text messaging pipelines (e.g., a shared computing facility may host a plurality of text messaging pipelines and/or respective pipeline modules).

One embodiment of configuring a text messaging pipeline is illustrated by an exemplary method 100 in FIG. 1. At 102, the method begins. At 104, a pipeline module list comprising at least one pipeline module to be associated with a text messaging pipeline is received. The pipeline module list may be received through an online service in which a user is engaged. The at least one pipeline module may comprise user defined pipeline modules, predefined pipeline modules, $3^{rd}$ party services, and/or other modules that may be associated with the text messaging pipeline. The at least one pipeline module may have been selected based upon a presented set of available pipeline modules (e.g., through a graphical user interface presented to a user).

At 106, the text messaging pipeline may be configured according to the pipeline module list. For example, a module list may comprise predefined pipeline modules (e.g., a message logging pipeline module and a scripting engine module), a third party service (e.g., a set of script to execute with the scripting engine module), and a user defined pipeline module (e.g., a filter message module). A text messaging pipeline may be configured to comprise the message logging pipeline module, the scripting engine module associated with the set of script, and the filter message module. During text message processing, text message workflow (e.g., a received text message that is to be processed then delivered) may be processed through the modules in a configured manner. For example, the message logging pipeline module may be executed upon the text message to log the information. Next, the scripting engine may execute the set of script upon the text message. Finally, the filter message module may be executed upon the text message. The resulting text message may be delivered to the recipient through various routing and/or delivery techniques.

It may be appreciated that the method 100 may be hosted within an online service (e.g., a shared computing facility). For example, a user may log into the online service. Upon verification, the user may create a pipeline module list based upon a set of available pipeline modules. The user may add additional $3^{rd}$ party services and/or user defined pipeline modules. Upon receiving the pipeline module list, a text messaging pipeline may be created and/or configured. The user may associate a computer application and/or other text messaging enabled devices with the text messaging pipeline. The text messaging pipeline may be hosted through the online service (e.g., a shared computing facility). Text message workflow to and from the registered computer application and/or associated devices may be processed through the text messaging pipeline within the online service. Text message workflow may comprise sending and/or receiving short message service messages.

It may be appreciated that during configuration of the text messaging pipeline, pipeline modules and/or other text messaging pipelines may be restricted from interfacing with one another. To facilitate text message processing within the text messaging pipeline, an execution component and/or interface components may be used to orchestrate text message workflow through the text messaging pipeline. At 108, the method ends.

Figure 2:
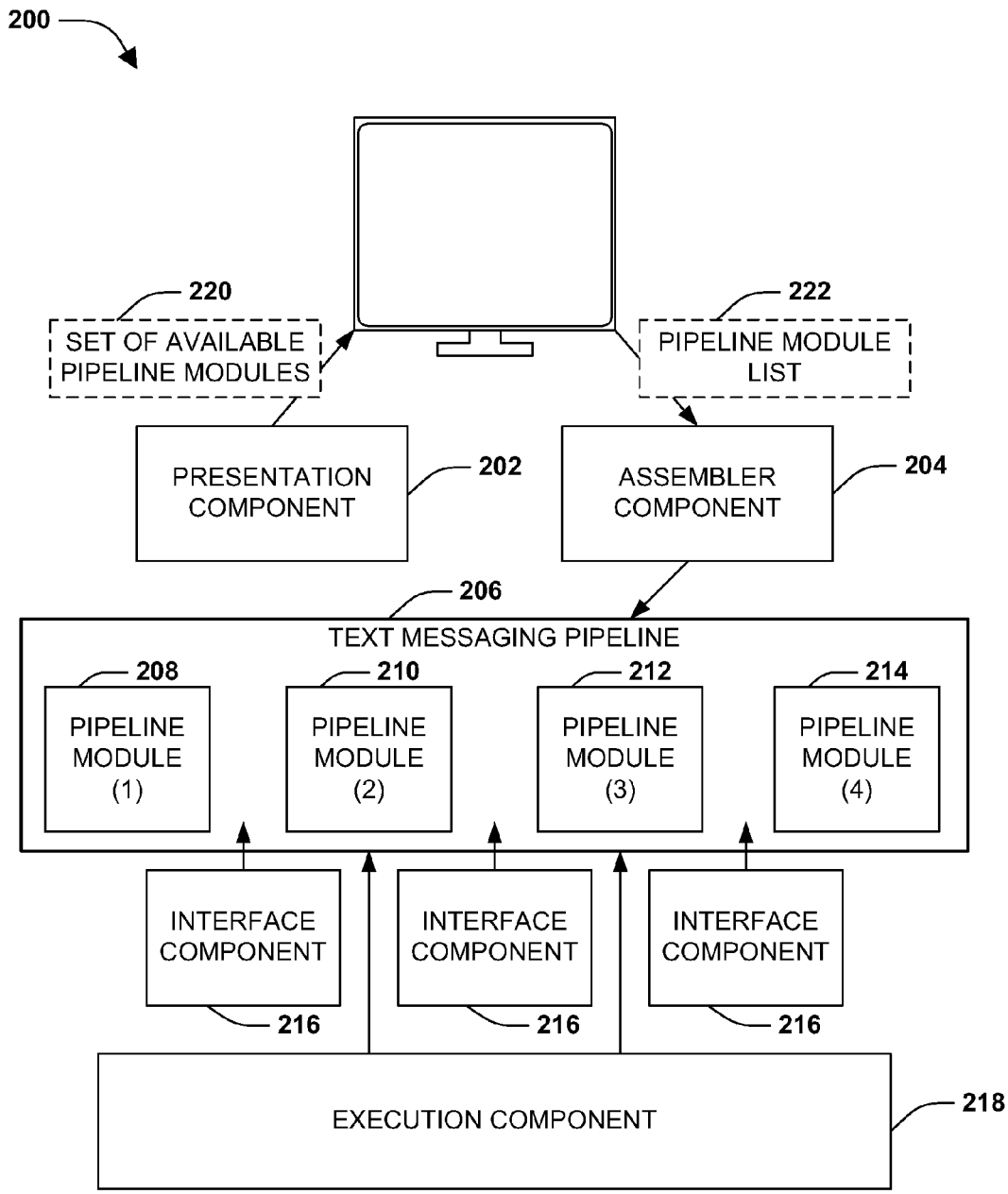
FIG. 2 is a component block diagram illustrating an exemplary system for configuring a text messaging pipeline.

FIG. 2 illustrates an example 200 of a system configured for UI element design layout. The system may comprise an assembler component 204. The system may further comprise a presentation component 202, an execution component 218, and/or an interface component 216. The presentation component may be configured to present a set of available pipeline modules 220 (e.g., FIG. 3) from which a user may select to generate a pipeline module list 222.

The set of available pipeline modules 220 may comprise predefined pipeline modules and/or user defined pipeline modules. Predefined pipeline modules may comprise prebuilt pipeline modules (e.g., built and exposed by a $3^{rd}$ party, built and exposed by a host of an online service hosting a text messaging service, etc.) that a user may select without further development, thus providing core out of the box pipeline components. User defined pipeline modules may be modules custom created by a user and may comprise arbitrary source code. The set of available pipeline modules 220 may comprise $3^{rd}$ party services that may be selected and/or associated with a pipeline module. The presentation component 202 may be configured to operate within an online service and/or other computing environments.

The assembler component 202 may be configured to receive the pipeline module list 222. The pipeline module list 222 may be received through an online service with which a user is engaged. The pipeline module list 222 may comprise at least one pipeline module (e.g., a pipeline module (1) 208, a pipeline module (2) 210, a pipeline module (3) 212, and/or a pipeline module (4) 214) to associate with a text messaging pipeline 206. The assembler component 202 may be configured to configure the text messaging pipeline 206 according to the pipeline module list 222. For example, the assembler component 202 may determine which pipeline modules are trusted. This may facilitate security and permissions between a user, a computer application, and/or pipeline modules that may be associated with the text messaging pipeline 206.

During configuration, the assembler component 202 may arrange pipeline modules according to a set of logic to provide a logical ordering for execution of text message workflow within the text messaging pipeline 206. For example, it may be advantageous to filter a message before translating the message; otherwise information that was translated may later be filtered, thus wasting resources.

The assembler component 202 may be configured to associated third party services with pipeline modules within the text messaging pipeline 206. For example, a spam filter module may be configured within the text messaging pipeline 206. The spam filter may access a third party service that provides a spam filter list. The assembler component 202 may associate the desired third party service with a respective pipeline module.

In one example, during configuration, the assembler component 202 may be configured to configure at least one interface component (e.g., an interface component 216) between respective pipeline modules within the text messaging pipeline 206. Because pipeline modules may be autonomous (e.g., self contained with respect to other pipeline modules and/or other text messaging pipelines) to prevent interference and/or incompatibility, an interface component may be utilized to facilitate movement of text message workflow between pipeline modules. Because pipeline modules and/or third party services may comprise arbitrary source code it may be advantageous to provide interface components for routing of information in a standardize manner. For example, a translation pipeline module may translate a text message within a text message workflow. An interface component may extract the translated text message and input it into a message log pipeline module.

The execution component 218 may be configured to execute the text messaging pipeline 206 upon text message workflow. The execution component 218 may be configured to execute the text messaging pipeline 206 through an online service with which a computer application may be engaged. For example, a computer application may be associated with the text messaging pipeline 206 during configuration. An online service may host the configuration of the text message pipeline 206 and/or the execution of the text message pipeline 206 upon text message workflow to and from the computer application. The execution component 218 may be configured to call (e.g., invoke for execution) pipeline modules in a configured sequence. The execution component 218 may be configured to ensure text message workflow is pushed through correct pipeline modules.

Text message workflow may comprise sending a text message, receiving a text message, short message service messages, and/or other data which may be processed within the text messaging pipeline 206. In one example, execution of the text messaging pipeline 206 may comprise executing source code within a pipeline module upon text message work flow. Execution may also comprise sending and receiving information between pipeline modules and/or third party services. In another example, execution of the text messaging pipeline 206 may comprise verifying security, permissions, digital signatures, performing routing of text message workflow to a router for delivery, and/or other administrative functioning of the text messaging pipeline 206. In yet another example, execution of the text messaging pipeline 206 may comprise fault handling within the text messaging pipeline 206. It may be appreciated that an execution component may be configured to facilitate any functioning associated with text message processing of text message workflow within a text messaging pipeline.

Figure 3:
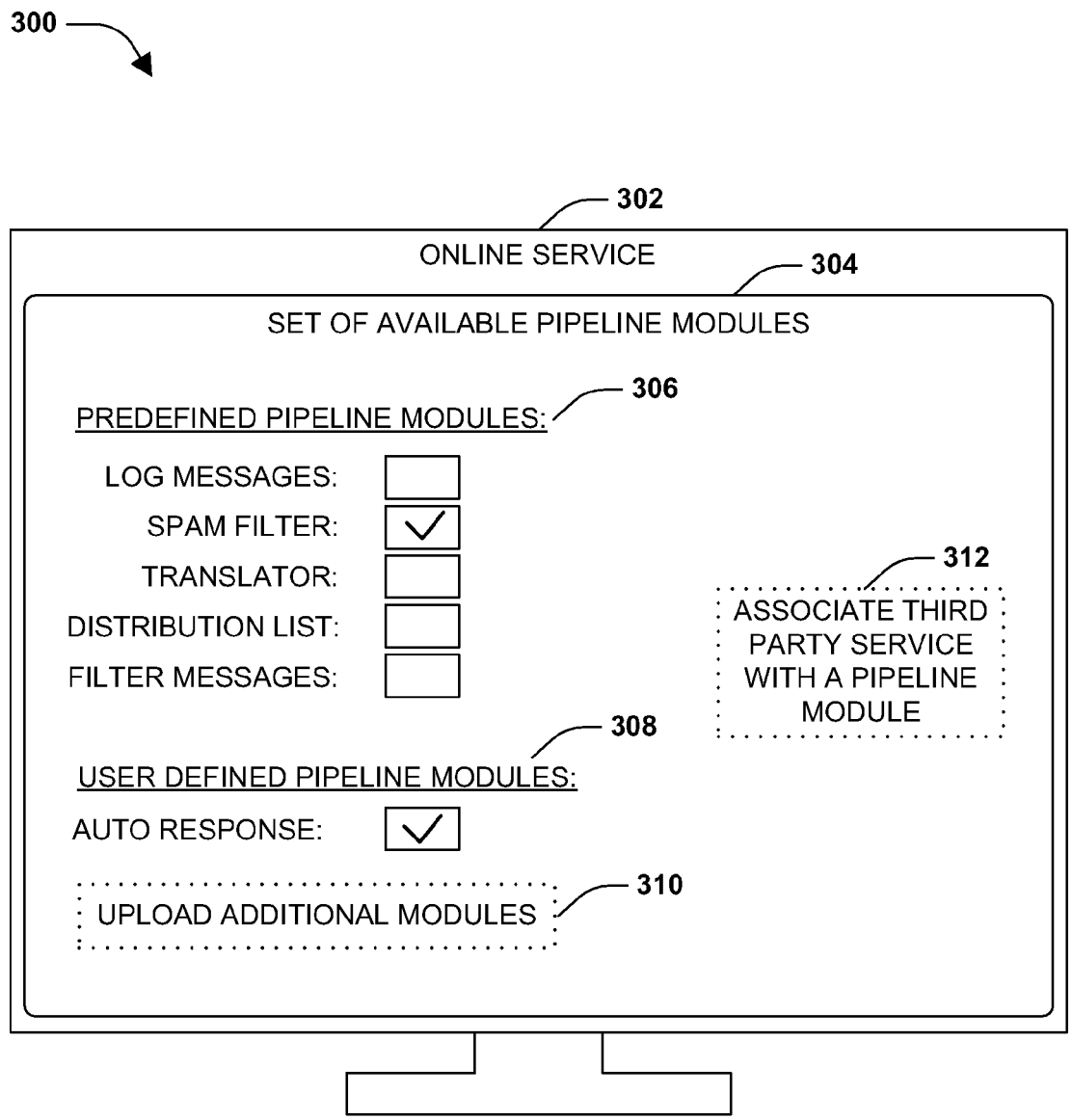
FIG. 3 is an illustration of an example of presenting a set of available pipeline modules.

FIG. 3 illustrates an example 300 of presenting a set of available pipeline modules. A set of available pipeline modules 304 may be presented through an online service 302. In one example, the online service 302 may comprise a website allowing a user to register and setup text message processing through text messaging pipelines. The online service 302 may allow the user to associate and/or manage a computer application and/or other text messaging devices that may utilize the text message processing.

The set of available pipeline modules 304 may comprise predefined pipeline modules 306, user defined pipeline modules 308, associated third party services, and/or other functionality that may be associated with a pipeline module and/or a text messaging pipeline. For example, the predefined pipeline modules 306 may comprise a log messages pipeline component, a spam filter pipeline component, a translator pipeline component, a distribution list pipeline component, and/or a filter messages pipeline component. A user may have the ability to select (e.g., a check mark corresponding to a spam filter pipeline component) desired pipeline modules to build a pipeline module list. The user may select user defined pipeline modules 308 (e.g., a check mark corresponding to an auto response pipeline component) to build and/or add to the pipeline module list.

Within the online service 302, an upload of additional modules 310 may be performed. For example, a user may create a user defined pipeline module comprising arbitrary source code that is to be executed as a pipeline module within a text messaging pipeline. The user defined pipeline module may be uploaded and added into the pipeline module list. Within the online service 302, an association of a third party service with a pipeline module 312 may be performed. This allows third party services to be utilized by pipeline modules within a text messaging pipeline during execution. For example, a distribution list may be accessible from a third party service. This service may be associated with a distribution list pipeline module.

Upon creation of a pipeline module list, a text messaging pipeline may be created and/or configured based upon the pipeline module list.

Figure 4:
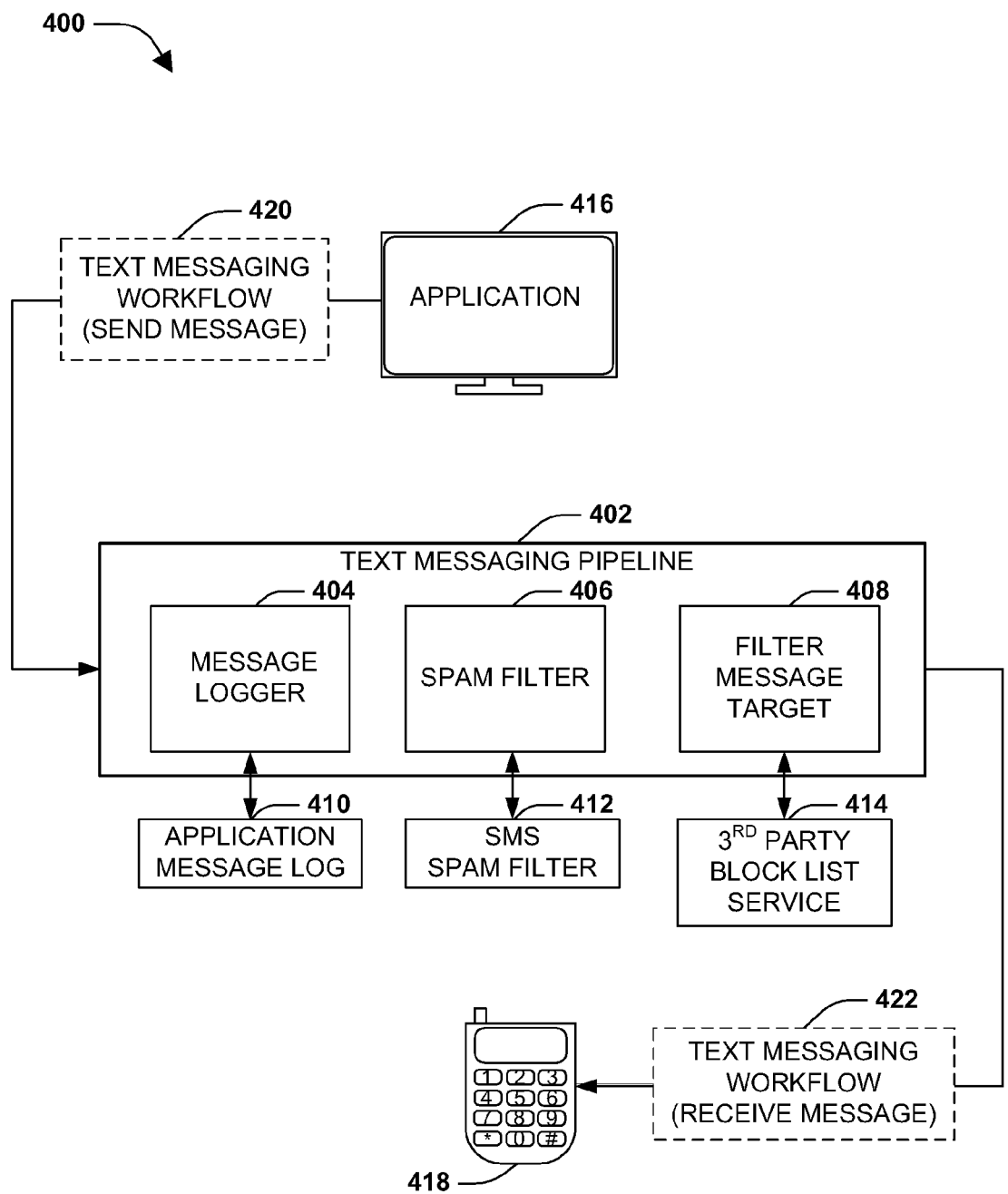
FIG. 4 is an illustration of an example of executing a text messaging pipeline upon text message work flow from an application to a remote communication device.

FIG. 4 illustrates an example 400 of executing a text messaging pipeline upon text message work flow from an application to a remote communication device. An application 416 may be associated with a text messaging pipeline 402 (e.g., registered through an online service). The text messaging pipeline 402 may comprise pipeline modules (e.g., a message logger 404, a spam filter 406, and a filter message target 408) associated with respective third party services (e.g., an application message log 410, an SMS spam filter 412, and a third party block list service 414).

The application 416 may create text message workflow 420. For example, the application 416 may send a text message to a remote communication device 418. The text messaging pipeline 402 may be executed upon the text message workflow 420. For example, the text message may be logged within the application message log 410. Next the text message may be processed by the SMS spam filter 412. Finally, the text message may be compared with the third party block list service 414 to determine whether the application 416 is black listed. Once the pipeline modules within the text messaging pipeline 402 have been executed upon the text message workflow 422, then the text message workflow 422 may be delivered to the remote communication device 418.

Figure 5:
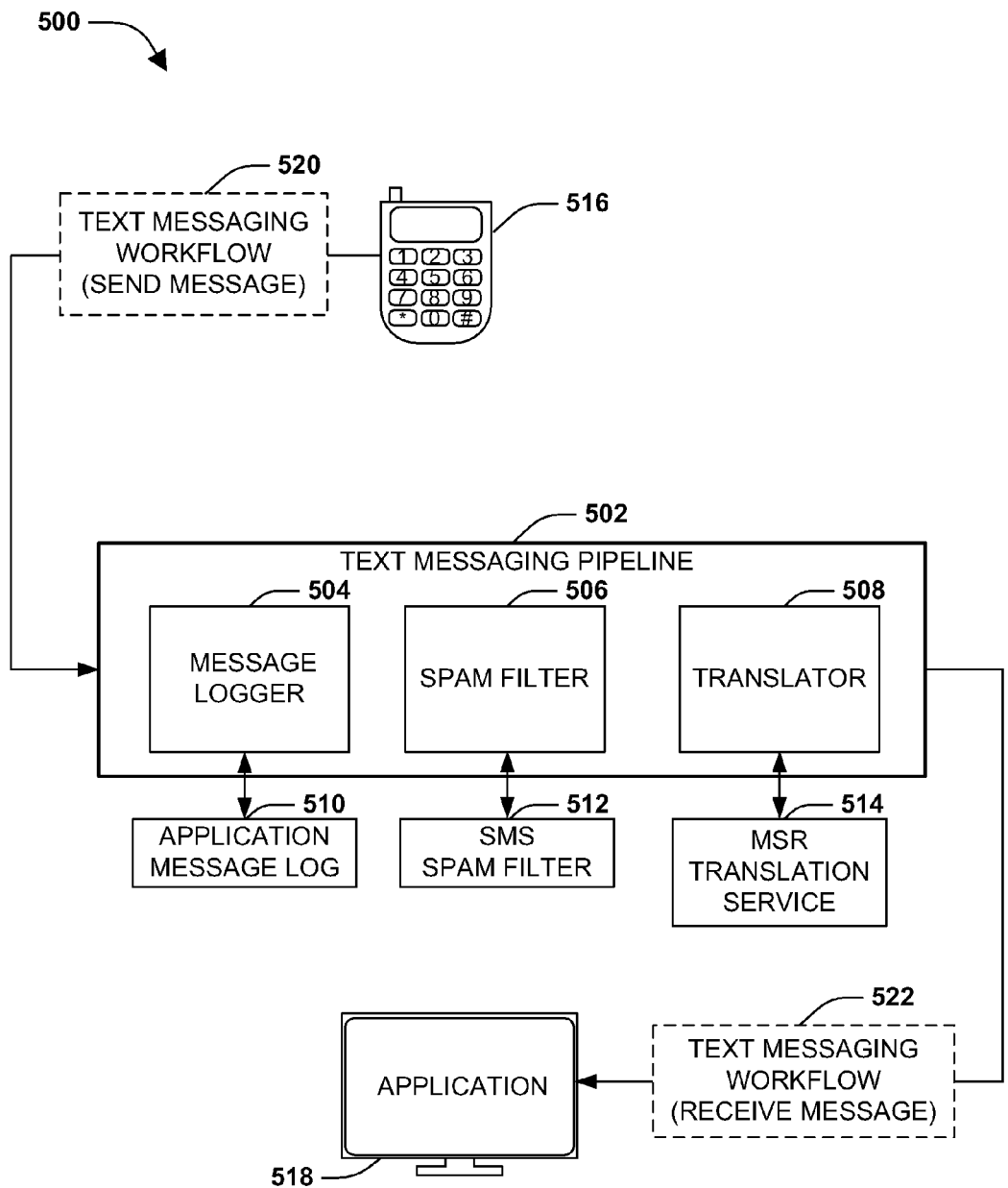
FIG. 5 is an illustration of an example of executing a text messaging pipeline upon text message work flow from a remote communication device to an application.

FIG. 5 illustrates an example 500 of executing a text messaging pipeline upon text message work flow from a remote communication device to an application. FIG. 5 along with FIG. 4 illustrates the bi-directionality of an example text messaging pipeline. An application 518 may be associated with a text messaging pipeline 502 (e.g., registered through an online service). The text messaging pipeline 502 may comprise pipeline modules (e.g., a message logger 504, a spam filter 506, and a translator 508) associated with respective third party services (e.g., an application message log 510, an SMS spam filter 512, and a MSR translation service 514).

The remote communication device 516 may create text message workflow 520. For example, the remote communication device 516 may send a text message to the application 518. The text messaging pipeline 502 may be executed upon the text message workflow 520. For example, the text message may be logged within the application message log 510. Next the text message may be processed by the SMS spam filter 512. Finally, the text message may translated by the MSR translation service 514. Once the pipeline modules within the text messaging pipeline 502 have been executed upon the text message workflow 522, then the text message workflow 522 may be delivered to the application 518.

It may be appreciated that text message workflow may be derived from a variety of scenarios. In one example, an SMS message may be sent from a communication device to a computer application as an Instant Message or as an Instant Message from the computer application to the communication device as an SMS message. In another example, a computer application may send text message workflow to another computer application. In yet another example, text message workflow may be created by a text message sent to a computer application for the purpose of becoming a post within a social networking blog.

Figure 6:
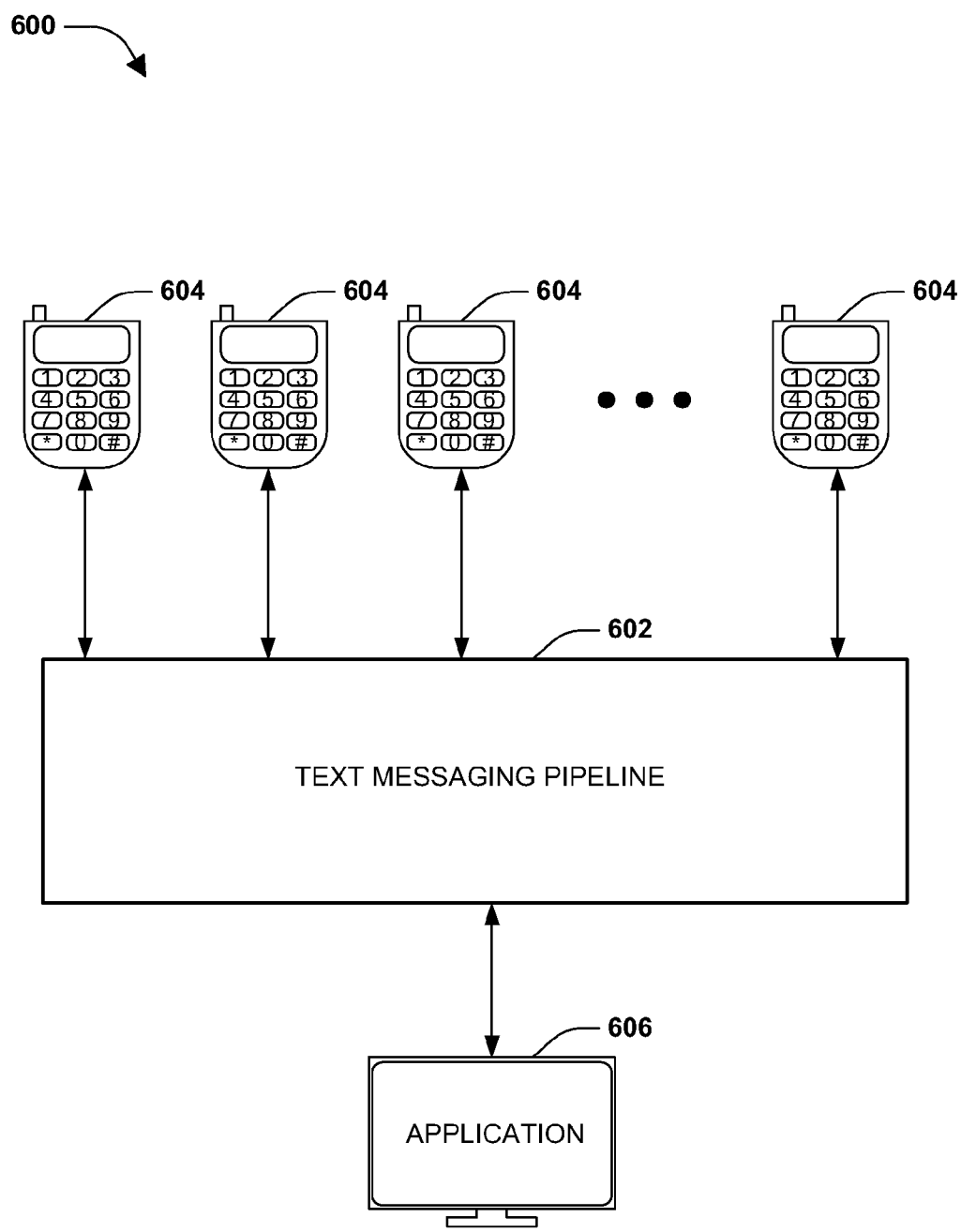
FIG. 6 is an illustration of an example of executing a text messaging pipeline upon text message workflow between remote communication devices and an application associated with the text messaging pipeline.

FIG. 6 is an illustration of executing a text messaging pipeline upon text message workflow between remote communication devices and an application associated with the text messaging pipeline. An application 606 may be associated with a text messaging pipeline 602. For example, the application 606 may have been registered through an online service to send and/or receive text messages (e.g., text message workflow) processed through the text messaging pipeline 602. Text message workflow originating from the application 606 may have the text messaging pipeline 602 and/or pipeline modules configured within the text messaging pipeline 602 executed upon the text message workflow. Also, text message workflow from remote communication devices 604 (e.g., Instant Messaging computer applications, cell phones, PDAs, remote sensors, etc.) to the application 606 may have the text messaging pipeline 602 and/or pipeline modules configured within the text messaging pipeline 602 executed upon the text message workflow.

For example, a contest where users may send text messages to vote for whom they want to win the contest may be held. The application 606 may be registered within an online service. The text messaging pipeline 602 may be configured to log messages, filter spam, and execute user defined script upon the text message workflow for formatting purposes. The functionality of the text messaging pipeline 602 may be performed by executing pipeline modules upon the text message workflow.

Examples of text message workflow within example 600 may comprise voting SMS messages from cell phones (e.g., remote communication devices 604) to the application 606. In another example, text message workflow may be voting Instant Messages from remote computers (e.g., remote communication devices 604) to the application 606. In yet another example, text message workflow may be confirmation SMS messages from the application 606 to remote communication devices 604.

Figure 7:
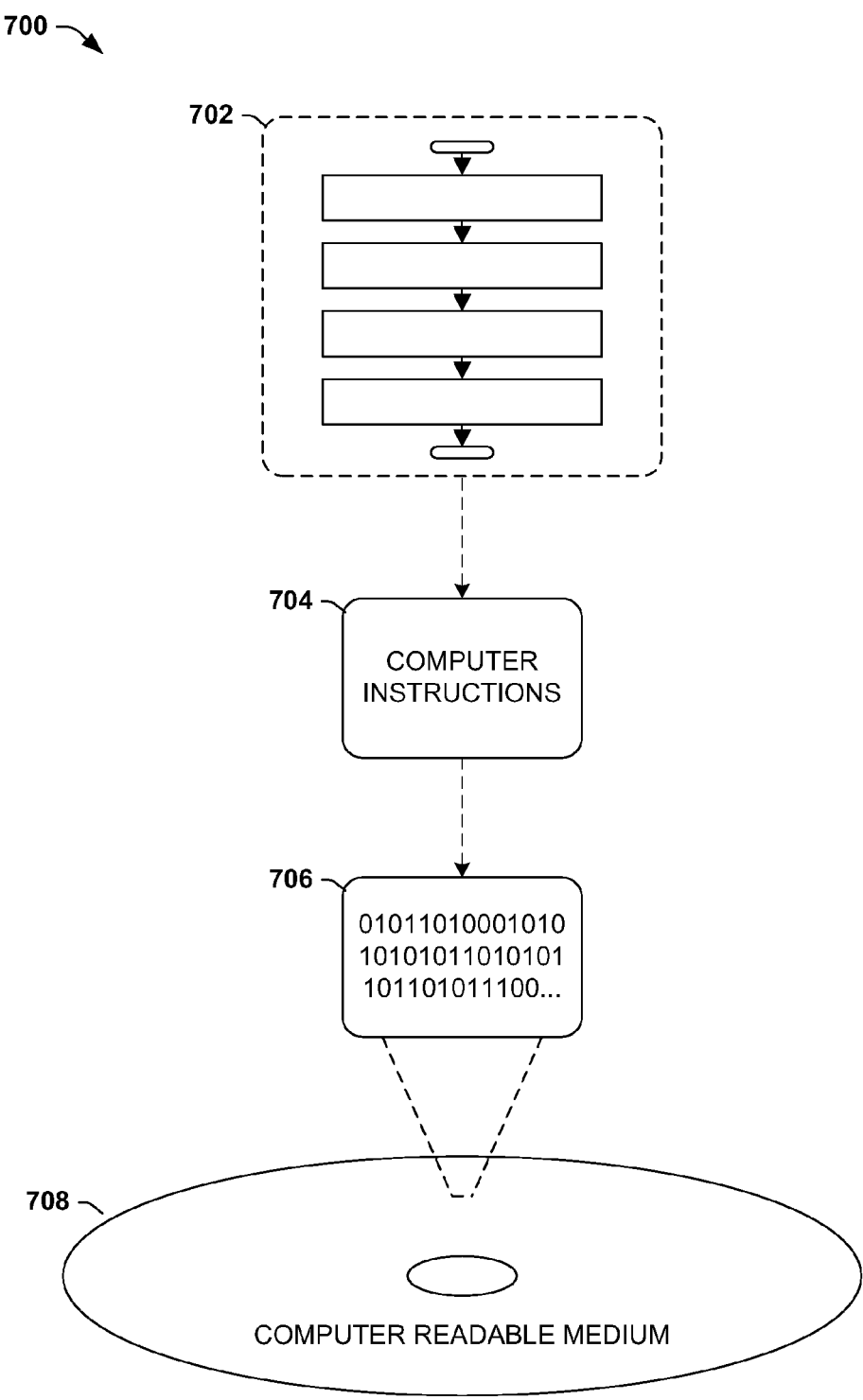
FIG. 7 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 7, wherein the implementation 700 comprises a computer-readable medium 708 (e.g., a CD-R, DVD-R, or a platter of a hard disk drive), on which is encoded computer-readable data 706. This computer-readable data 706 in turn comprises a set of computer instructions 704 configured to operate according to one or more of the principles set forth herein. In one such embodiment 700, the set of computer instructions 704 may be configured to perform a method 702, such as the exemplary method 100 of FIG. 1, for example. In another such embodiment, the set of computer instructions 704 may be configured to implement a system, such as the exemplary system 200 of FIG. 2, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 8:
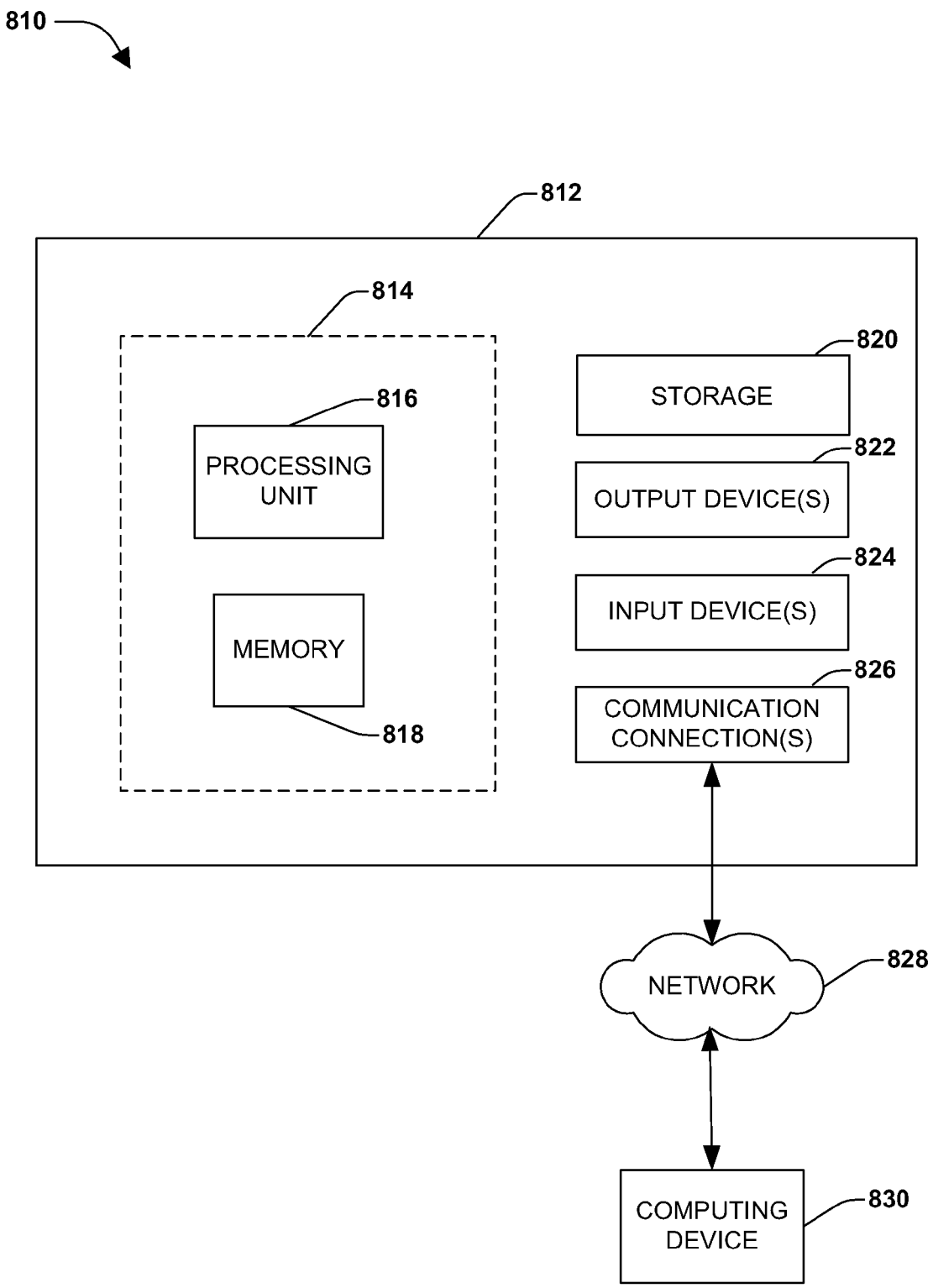
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 810 comprising a computing device 812 configured to implement one or more embodiments provided herein. In one configuration, computing device 812 includes at least one processing unit 816 and memory 818. Depending on the exact configuration and type of computing device, memory 818 may be volatile (such as RAM, for example), non-volatile (such as ROM, flash memory, etc., for example) or some combination of the two. This configuration is illustrated in FIG. 8 by dashed line 814.

In other embodiments, device 812 may include additional features and/or functionality. For example, device 812 may also include additional storage (e.g., removable and/or non-removable) including, but not limited to, magnetic storage, optical storage, and the like. Such additional storage is illustrated in FIG. 8 by storage 820. In one embodiment, computer readable instructions to implement one or more embodiments provided herein may be in storage 820. Storage 820 may also store other computer readable instructions to implement an operating system, an application program, and the like. Computer readable instructions may be loaded in memory 818 for execution by processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 812. Any such computer storage media may be part of device 812.

Device 812 may also include communication connection(s) 826 that allows device 812 to communicate with other devices. Communication connection(s) 826 may include, but is not limited to, a modem, a Network Interface Card (NIC), an integrated network interface, a radio frequency transmitter/receiver, an infrared port, a USB connection, or other interfaces for connecting computing device 812 to other computing devices. Communication connection(s) 826 may include a wired connection or a wireless connection. Communication connection(s) 826 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 812 may include input device(s) 824 such as keyboard, mouse, pen, voice input device, touch input device, infrared cameras, video input devices, and/or any other input device. Output device(s) 822 such as one or more displays, speakers, printers, and/or any other output device may also be included in device 812. Input device(s) 824 and output device(s) 822 may be connected to device 812 via a wired connection, wireless connection, or any combination thereof. In one embodiment, an input device or an output device from another computing device may be used as input device(s) 824 or output device(s) 822 for computing device 812.

Components of computing device 812 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 812 may be interconnected by a network. For example, memory 818 may be comprised of multiple physical memory units located in different physical locations interconnected by a network.

Those skilled in the art will realize that storage devices utilized to store computer readable instructions may be distributed across a network. For example, a computing device 830 accessible via network 828 may store computer readable instructions to implement one or more embodiments provided herein. Computing device 812 may access computing device 830 and download a part or all of the computer readable instructions for execution. Alternatively, computing device 812 may download pieces of the computer readable instructions, as needed, or some instructions may be executed at computing device 812 and some at computing device 830.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such features may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for configuring an SMS messaging pipeline, comprising:
    configuring the SMS messaging pipeline to order two or more pipeline modules comprised in the SMS messaging pipeline, the ordering comprising logically ordering a filtering module of the two or more pipeline modules in the SMS messaging pipeline and a translation module of the two or more pipeline modules in the SMS messaging pipeline such that execution of the filtering module in relation to an SMS message is performed prior to execution of the translation module in relation to the SMS message based upon a determination that using the filtering module to filter data corresponding to the SMS message prior to using the translation module to translate the data corresponding to the SMS message results in a first use of resources and using the translation module to translate the data corresponding to the SMS message prior to using the filtering module to filter the data corresponding to the SMS message results in a second use of resources, the first use of resources less than the second use of resources;
    determining that one or more pipeline modules of the two or more pipeline modules are trusted; and
    determining that at least one pipeline module of the two or more pipeline modules are digitally signed.

2. The method of claim 1, the determining that one or more pipeline modules of the two or more pipeline modules are trusted comprising receiving a list comprising an indication of the one or more pipeline modules.

3. The method of claim 1, at least one of the one or more pipeline modules provided with one or more permissions.

4. The method of claim 1, the at least one pipeline module associated with one or more digital signatures.

5. The method of claim 4, the one or more digital signatures corresponding to at least one of ownership or execution permission.

6. A system, comprising:
    one or more processing units; and
    memory comprising instructions that when executed by at least some of the one or more processing units perform a method comprising:
        configuring an SMS messaging pipeline to order two or more pipeline modules comprised in the SMS messaging pipeline, the ordering comprising logically ordering a non-translation module of the two or more pipeline modules in the SMS messaging pipeline and a translation module of the two or more pipeline modules in the SMS messaging pipeline such that execution of the non-translation module in relation to an SMS message is performed prior to execution of the translation module in relation to the SMS message based upon a determination that using the non-translation module prior to using the translation module results in a first use of resources and using the translation module prior to using the non-translation module results in a second use of resources, the first use of resources less than the second use of resources; and
        determining that one or more pipeline modules of the two or more pipeline modules are trusted.

7. The system of claim 6, the method comprising determining that at least one pipeline module of the two or more pipeline modules are digitally signed.

8. The system of claim 7, the at least one pipeline module associated with one or more digital signatures.

9. The system of claim 6, the non-translation module comprising a filtering module configured to filter the data corresponding to the SMS message.

10. The system of claim 6, the translation module configured to translate the data corresponding to the SMS message.

11. The system of claim 6, the determining that one or more pipeline modules of the two or more pipeline modules are trusted comprising receiving a list comprising an indication of the one or more pipeline modules.

12. The system of claim 6, at least one of the one or more pipeline modules provided with one or more permissions.

13. A computer readable storage device comprising instructions that when executed perform a method, comprising:
    configuring a text messaging pipeline to order two or more pipeline modules comprised in the text messaging pipeline, the ordering comprising ordering a non-translation module of the two or more pipeline modules in the text messaging pipeline and a translation module of the two or more pipeline modules in the text messaging pipeline such that execution of the non-translation module in relation to a text message is performed prior to execution of the translation module in relation to the text message based upon a determination that using the non-translation module prior to using the translation module results in a first use of resources and using the translation module prior to using the non-translation module results in a second use of resources, the first use of resources less than the second use of resources.

14. The computer readable storage device of claim 13, the method comprising determining that one or more pipeline modules of the two or more pipeline modules are trusted.

15. The computer readable storage device of claim 13, the method comprising determining that one or more pipeline modules of the two or more pipeline modules are digitally signed.

16. The computer readable storage device of claim 13, the non-translation module comprising a filtering module.

17. The computer readable storage device of claim 16, the filtering module configured to filter data corresponding to the text message.

18. The computer readable storage device of claim 13, the text message comprising an SMS message.

19. The computer readable storage device of claim 13, the method comprising:
    receiving a user request, through an online service website, to associate a scripting engine pipeline module with the text messaging pipeline;

receiving a user defined script, uploaded through the online service website, that is to be executed by the scripting engine pipeline module upon a second text message; and configuring the text messaging pipeline to execute the scripting engine pipeline module upon the second text message.

20. The computer readable storage device of claim 13, the translation module configured to translate data corresponding to the text message.

* * * * *